United States Patent [19]

Rousselot et al.

[11] Patent Number: 4,819,743

[45] Date of Patent: Apr. 11, 1989

[54] ELECTROMECHANICAL OPERATING DEVICE FOR A SLIDINGLY MOVABLE DOOR

[75] Inventors: André J. Rousselot, Scionzier; Georges Charnay, Cluses, both of France

[73] Assignee: Somfy, France

[21] Appl. No.: 52,838

[22] Filed: May 21, 1987

[30] Foreign Application Priority Data

Jun. 4, 1986 [FR] France .................. 86 08059

[51] Int. Cl.$^4$ ............................. E05F 15/14
[52] U.S. Cl. ..................... 74/89.15; 49/199; 49/362; 74/424.8 R
[58] Field of Search ............ 74/424.8 R, 89.15; 49/199, 362

[56] References Cited

U.S. PATENT DOCUMENTS 4,198,786 4/1980 Monot ......................... 74/424.8 R Primary Examiner—Leslie A. Braun
Assistant Examiner—Scott Anchell
Attorney, Agent, or Firm—Kane, Dalsimer, Sullivan, Kurucz, Levy, Eisele and Richard

[57] ABSTRACT

Electromechanical operating device for a slidingly movable door, which device comprises a motor driving a worm on which is mounted a nut connected to the door which is is to be moved, said nut being secured in respect of rotation by a slide guide having a step at the point corresponding to the end of the stroke of the door. This step allows a certain rotation of the nut and constitutes a stop preventing the rearward displacement of the nut when the latter is acted on by means of the door.

The nut is composed of two parts axially fastened to one another and mounted for rotation one about the other, these parts being so shaped as to ensure that they will be fastened together in respect of rotation with considerable angular play.

The aim of the device is to prevent untimely unlocking of the closed door through the elastic torsional cocking of the worm.

1 Claim, 5 Drawing Sheets

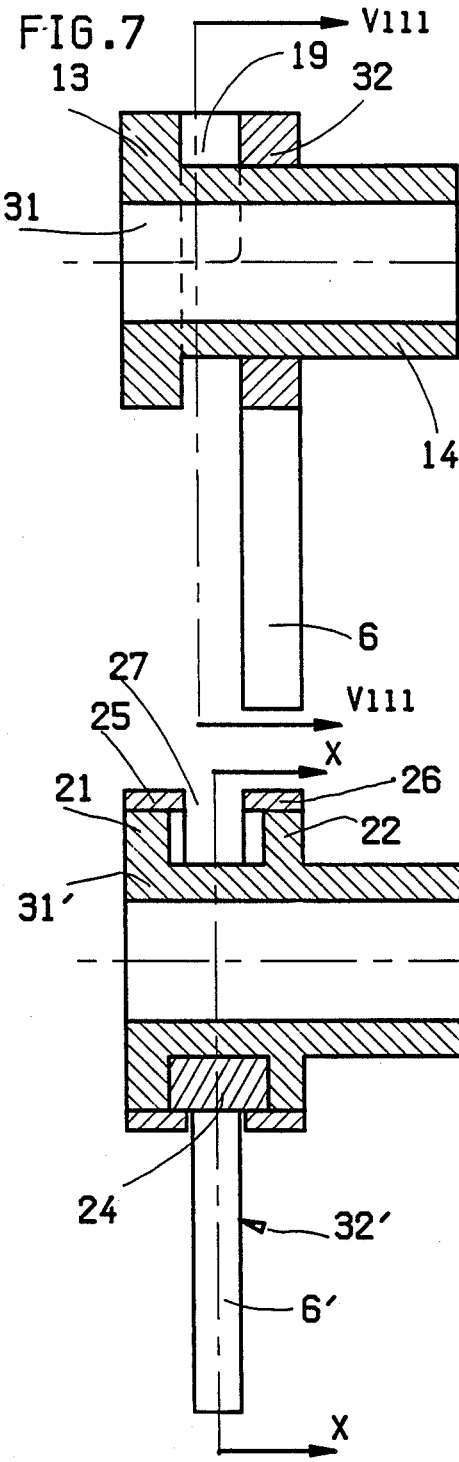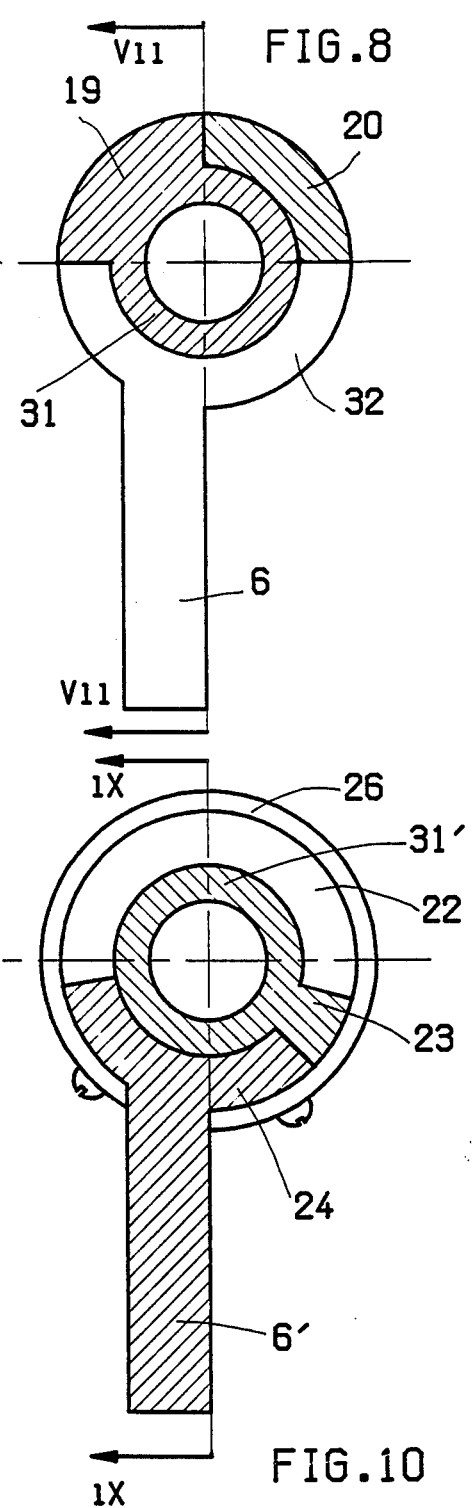

ELECTROMECHANICAL OPERATING DEVICE FOR A SLIDINGLY MOVABLE DOOR

FIELD OF THE INVENTION

The present invention relates to an electromechanical operating device for a slidingly movable door, which device comprises a motor driving a worm on which is mounted a nut connected to the door which is to be moved, said nut being secured in respect of rotation by a slide guide having a step at the point corresponding to the end of the stroke of the door, this step allowing a certain rotation of the nut and constituting a stop preventing the rearward displacement of the nut when the latter is acted on by means of the door.

PRIOR ART

A device of this kind is known from U.S. Pat. No. 4,198,176. The step in the slide guide has the effect of locking the door in the closed position. The part of the nut which cooperates with the slide guide, consisting in this particular case of a roller, moves out of the slide guide when it arrives at the height of the step, then striking radially against a surface parallel to the screw, on which surface it rolls until it arrives against a limit stop. The worm is then locked in respect of rotation and the motor is stopped by door locking detection means, which may be in the form of a switch associated with the limit stop and operated by the roller. This roller is in addition situated opposite a wall directed radially in relation to the worm, in such a manner that any attempt to open the door by direct action on the latter is frustrated by the radial wall, against which the roller comes to bear, so that the door is effectively locked.

A device of this kind is entirely satisfactory when the doors controlled in this manner are light and make only short movements. For these doors the worm is relatively short in relation to its diameter, and the drive motors are of moderate power. On the other hand, when it is required to operate relatively heavy doors which make long movements, such as gates or tilting garage doors, it is necessary to have a relatively long worm and a motor developing considerable torque. In the case of the known device the motor and its reduction gearbox continue to turn for a brief moment after the roller has come to bear against the limit stop, because of the inertia of the motor and the device controlling its stopping. This rotation gives rise to elastic torsion of the worm, which is thus cocked after the style of a spring. Once the motor has stopped, the worm is uncocked, thus driving the gearbox with a torque substantially equal to the torque delivered by the motor-gearbox unit. The motor is consequently driven in the reverse direction, in a particularly violent manner because of the step-up action of the gearbox acting in the reverse direction. The inertia acquired by the electric motor in turn gives rise to the driving of the worm through an angle greater than that of its torsion, and the nut, driven by the worm, moves out of its locking position so that the lock device becomes inoperative.

The present invention seeks to obviate this disadvantage, that is to say to ensure locking in any circumstances, whatever the stroke and the useful torque of the motor-reduction gear unit.

SUMMARY OF THE INVENTION

To this end, the linear drive device according to the invention is characterized in that the nut consists essentially of two parts axially fastened to one another and mounted for rotation one about the other, these parts being so shaped as to ensure that they will be fastened together in respect of rotation with considerable angular play, the outer part of the nut cooperating with the slide guide.

Because of the two-part construction of the nut and of the angular play between these two parts, the worm is able, at the end of the stroke and when the motor has stopped, to make an abrupt rotation in the reverse direction without driving the outer part of the nut which is engaged in the step in the slide guide.

The two parts of the nut can be fastened together in respect of rotation simply by means of axial projections having the shape of segments of a circular crown.

BRIEF DESCRIPTION OF THE DRAWINGS

The invention will be explained below in greater detail with the aid of examples of its embodiment, which are described below with reference to the accompanying drawings, in which:

FIG. 7 is a detailed view of the nut in a first embodiment, in section on the line VII—VII in FIG. 8;

FIG. 8 is a view on section on the line VIII—VIII in FIG. 7;

FIG. 9 is a detailed view of the nut in a second embodiment, in section on the line IX—IX in FIG. 10;

FIG. 10 is a view in section on the line X—X in FIG. 9.

DESCRIPTION OF THE PREFERRED EMBODIMENTS

Figure 1:
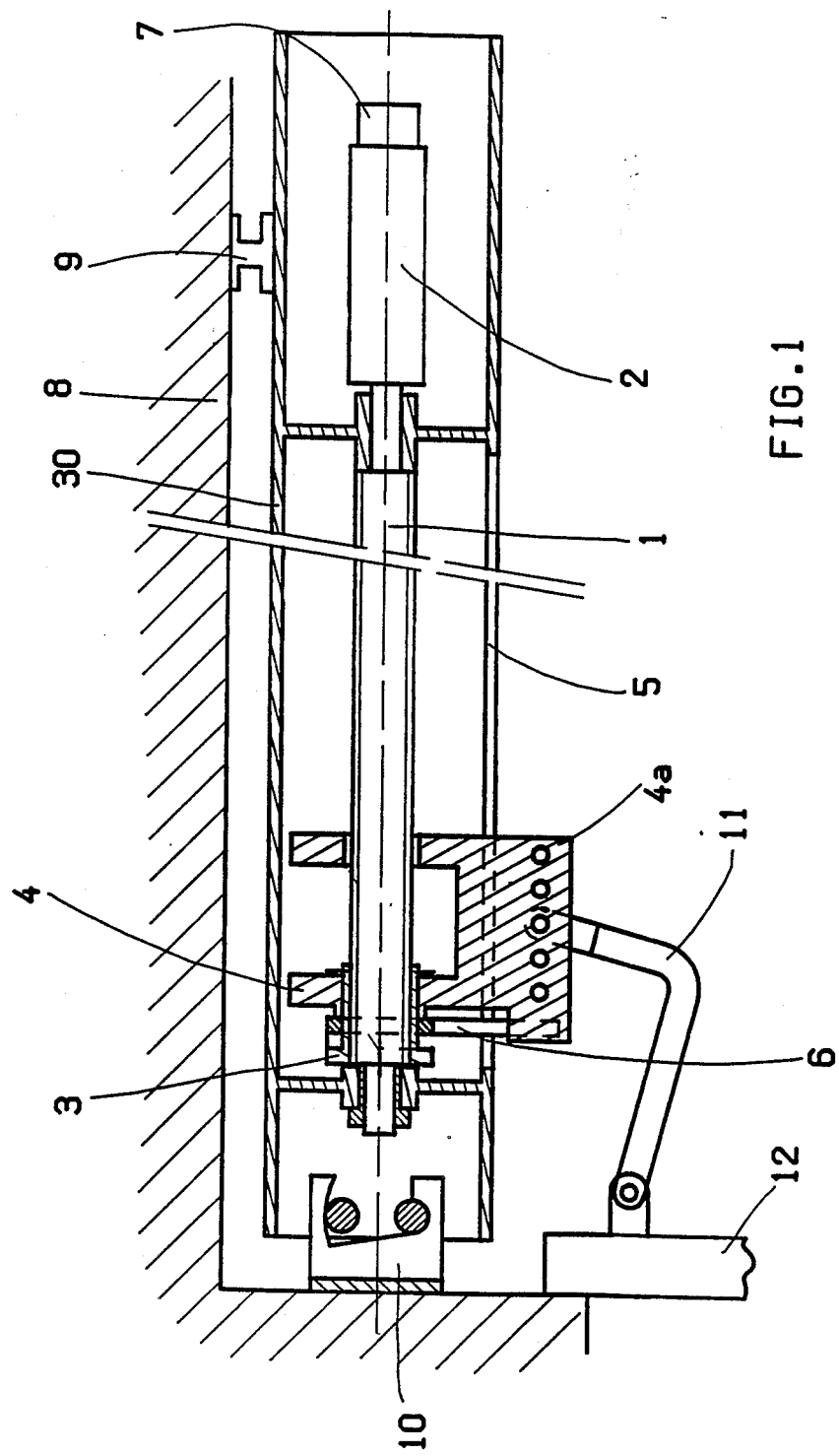
FIG. 1 is a schematic view in longitudinal section of an electromechanical linear drive device.

The linear drive device shown in FIG. 1 comprises essentially a worm 1 mounted in a tubular frame 30 and driven by a motor-reduction gear unit 2, on which worm is mounted a nut 3 fastened to a carriage 4 whose narrow bottom part 4a passes through the frame 30 by way of a longitudinal slot 5 which at the same time serves as a slide guide for a finger 6 fastened to the nut 3. The motor 2 is stopped automatically by a stopping device 7 when the carriage 4 reaches the end of its stroke. This stopping device 7 is of the centrifugal type, associated with the motor, and at the same time constitutes a safety switch intended for stopping the motor in the event of the gate or tilting door encountering an obstacle. In the example illustrated the frame 30 is fixed on the one hand to the ceiling 8 of a garage by a suspension member 9, and on the other hand to the front wall of the garage by a support 10. The carriage 4 is connected by a connecting rod 11 to a tilting and sliding door 12.

Figure 2:
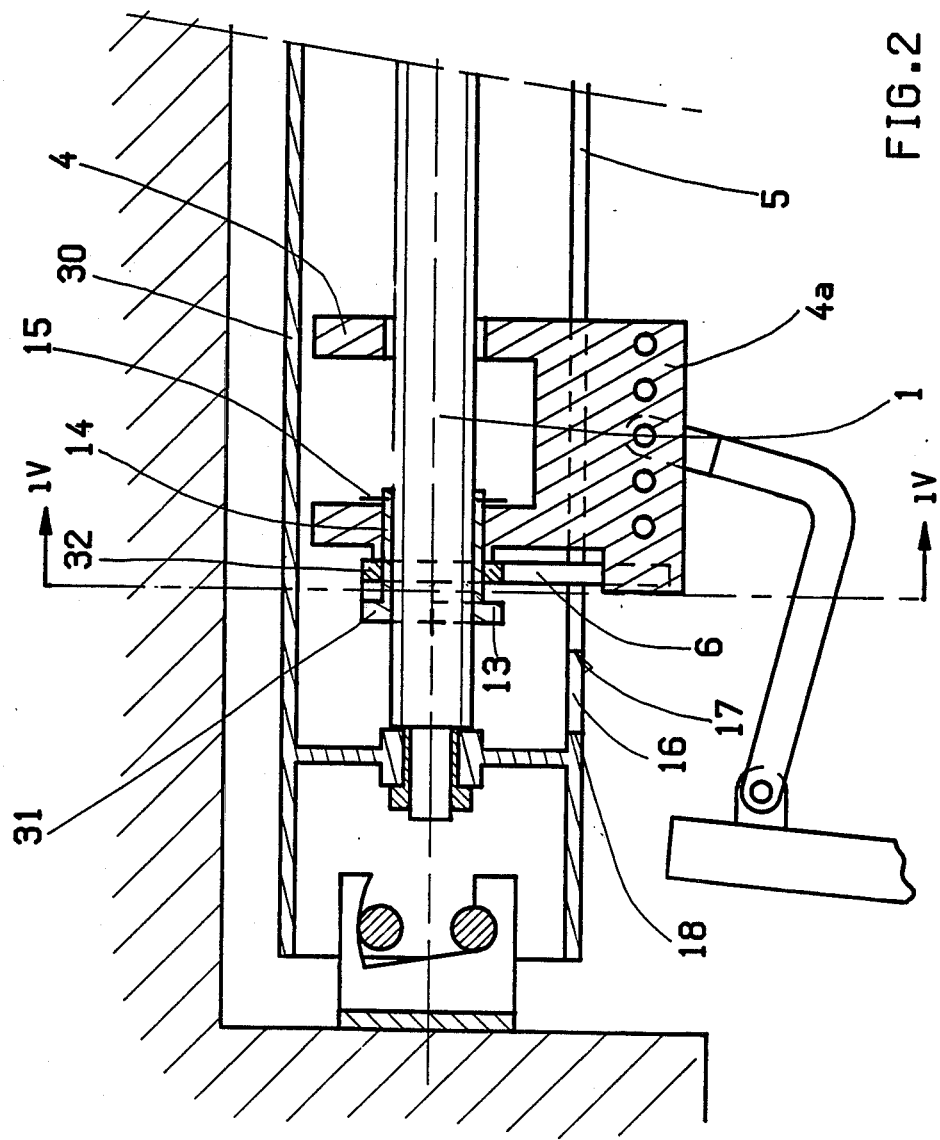
FIG. 2 is a detail of FIG. 1, showing the nut before it reaches its limit stop.
Figure 3:
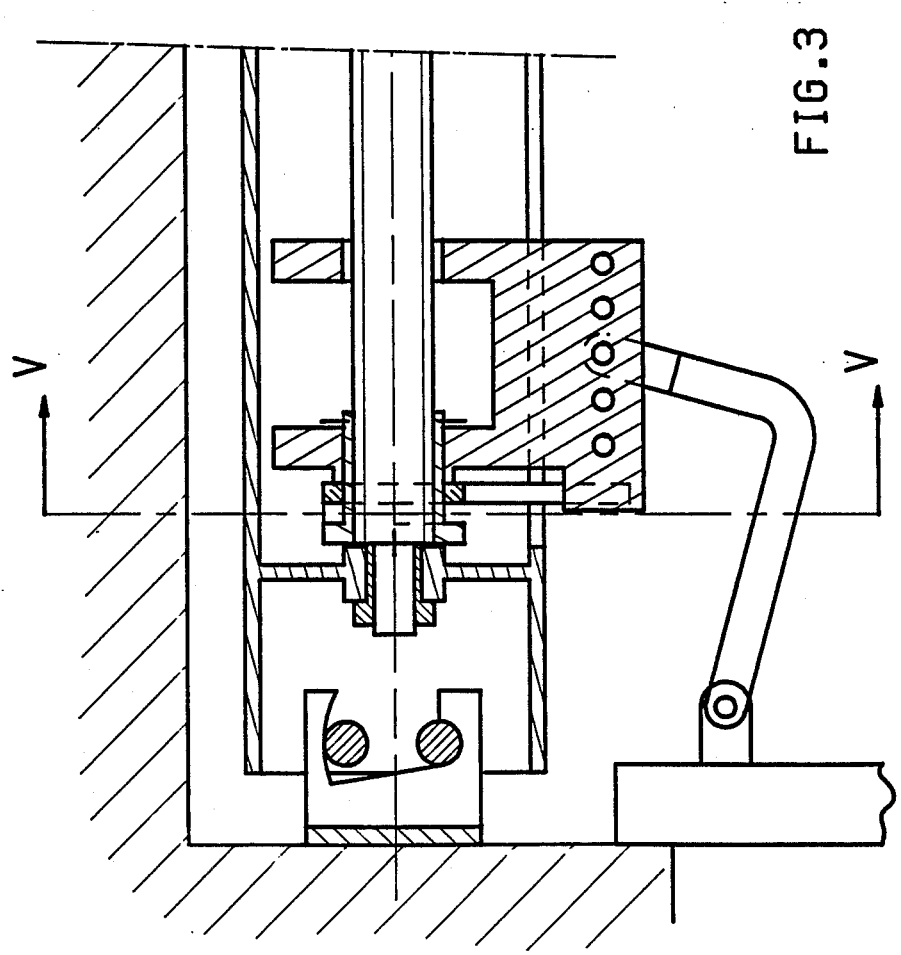
FIG. 3 is a similar view to FIG. 2, showing the nut when it has reached its limit stop.
Figures 4, 5, 6:
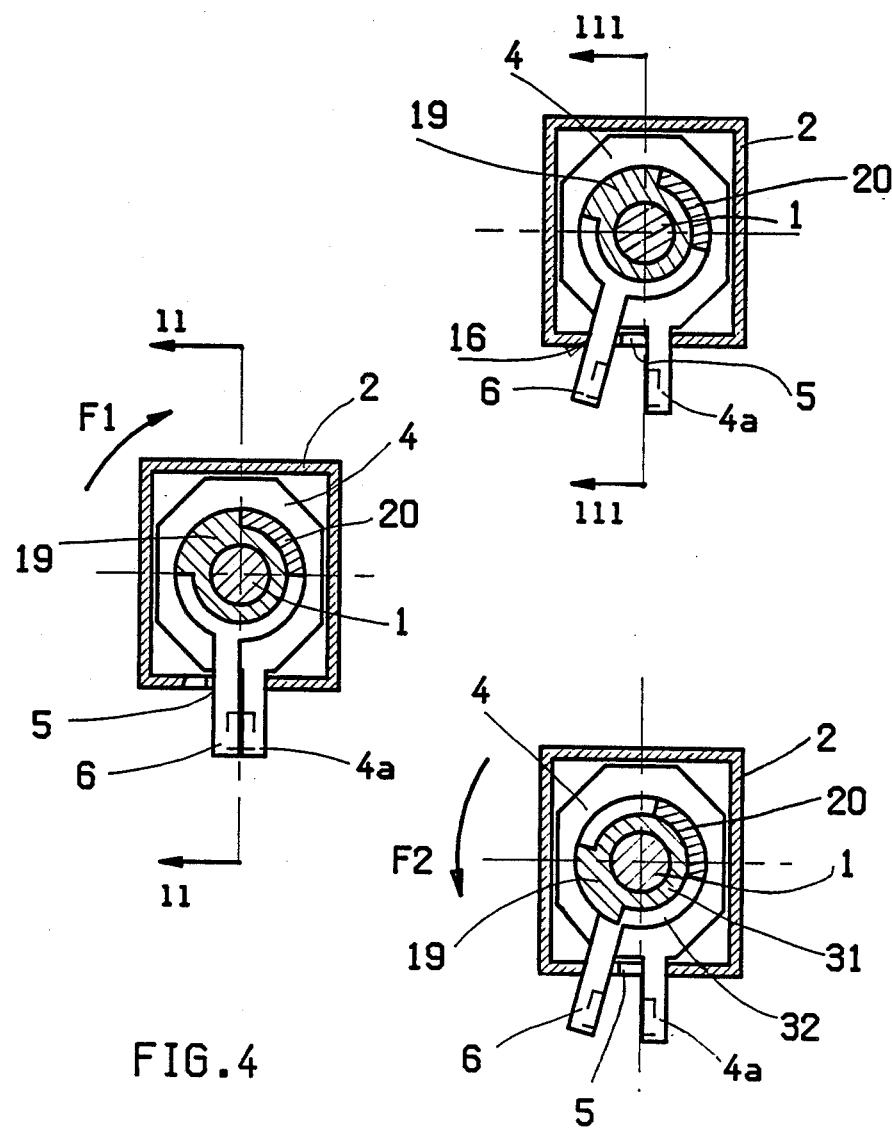
FIG. 4 is a view in section on the line IV—IV in FIG. 2.
FIG. 5 is a view in section on the line V—V in FIG. 3.
FIG. 6 is a view in section on the line V—V in FIG. 3, showing the worm driven in the reverse direction.

As can be seen from FIG. 2, the nut 3 is composed of two parts 31 and 32. The first part 31 consists of an end plate 13 and a threaded sleeve 14 passthrough a part of the carriage 4 and held axially on said carriage by a circlip 15. The second part 32 is mounted for rotation about the sleeve 14 of the first part, between the carriage 4 and the end plate 13 of the first part, in such a manner that it is fixed for translatory movement with the first part 31. The parts 31 and 32 of the nut are in addition also fixed for rotation with one another, but with considerable angular play, as will be described later on. The part 32 carries the finger 6, which moves in the slide guide 5, preventing the part 32 of the nut from turning. The finger 6 also comes to bear against an extension of the rib 4a of the carriage 4. The slot constituting the slide guide 5 has a width approximately equal to the total width of the finger 6 and the rib 4a (FIG. 4). At the point corresponding to the end of the stroke of the nut 3, the slot 5 has a step formed by an abrupt widening 16, in such a manner that the slide guide 5 has at this point a 90° elbow 17. The longitudinal slot provided in the frame 2 and forming the slide guide 5 stops at 18, this end 18 constituting a limit stop for the finger 6, that is to say for the nut 3. The worm 1 is mounted between two bearings.

The nut will now be described in detail with reference to FIGS. 7 and 8. The end plate 13 of the first part 31 of the nut has an axial projecting part 19 extending over about a quarter of a circle in the direction of the second part 32 of the nut, while said second part has an axial projecting part 20 extending in the direction of the end plate 13 of the first part and over about a quarter of a circle. The parts 19 and 20 are coplanar, so that they effect mutual driving of the two parts 31 and 32 of the nut with an angular play of about 180°.

The operation of the device will now be described with reference to FIGS. 2 to 6. The nut 3 and the carriage 4 are shown in the intermediate position in FIG. 2. In this position the worm 1 turns in the direction of the arrow F1 (FIG. 4). It drives the first part 31 of the nut 3 in the same direction, the projecting portion 19 of said first part 31 coming to bear against the projecting portion 20 of the second part 32 of the nut, which is secured against rotation by its finger 6, bearing against the slide guide 5. When the finger 6 passes beyond the elbow 17, it tips abruptly into the slide guide step 16, as shown in FIG. 5, and continues its travel until it comes to bear against the limit stop 18, thereby locking the worm in respect of rotation and causing the centrifugal stopping device 7 to react. The electric motor 2, continuing to turn for a brief moment because of the reaction time of the stopping device 7 and the inertia of the motor, imparts an elastic torsion to the worm 1, which is thus cocked after the style of a spring. When the motor has stopped, the worm 1 is uncocked, thus violently driving the reduction gear unit and the motor in the reverse direction. The inertia acquired by the motor in turn gives rise to the driving of the worm, in the direction of the arrow F2, through an angle greater than the torsion angle. The first part 31 of the nut is driven in that direction by the worm 1 (FIG. 6), but because of the angular play of 180° between the portions 19 and 20 of the two parts of the nut, the second part 3 of the nut is not driven, so that the finger 6 remains in its position inside the step 16, and prevents the opening of the door through direct action on the latter, in view of the fact that the finger 6 comes to bear against the elbow 17. The device thus remains locked.

Rotational coupling of the two parts 31 and 32 of the nut with angular play can be achieved in many other ways than that illustrated in FIGS. 7 and 8. A second form of construction of the nut is illustrated by way of example in FIGS. 9 and 10. In this embodiment, the first part 31' of the nut has two end plates 21 and 22 connected together by a portion 23 extending over about 30°. Between these two plates is mounted the second part 32' of the nut, consisting of a segment of a crown of a width corresponding to the distance between the two plates 21 and 22 and provided with a finger 6' corresponding to the finger 6. This segment of a crown 24 is secured radially between the plates 21 and 22 by the edges of two rounded plates 25 and 26 fixed respectively around each of the two end plates 21 and 22 and forming with these two end plates an annular groove of T-shaped profile, in which the segment of a crown 24 can slide freely between the two sides of the portion 23 of the first part 31' of the nut, that is to say with play of more than 180° in the embodiment illustrated.

We claim:

1. An electromechanical linear device for a slidingly movable door comprising a motor driving a worm, said worm threadably engaging a nut which is connected to the slidingly movable door, said nut comprising an inner part and a concentric outer part rotatably mounted on said inner part, said inner part and said outer part having means to limit relative rotation to less than one revolution; rotation of said nut being limited by a finger projecting radially from said outer part into a slide guide, said slide guide having an enlarged portion forming a step, said finger on said outer part rotates relative to said inner part so as to engage said step when said slidingly movable door is in a closed position, whereby said step acts as a stop to prevent movement of said nut is urged by said slidingly movable door.

* * * * *

UNITED STATES PATENT AND TRADEMARK OFFICE
CERTIFICATE OF CORRECTION

PATENT NO. : 4,819,743

DATED : April 11, 1989

INVENTOR(S) : Rousselot and Charnay

It is certified that error appears in the above-identified patent and that said Letters Patent is hereby corrected as shown below:

Claim 1, line 15 (the last line), before "is", please insert --when movement of said nut--.

Signed and Sealed this

Thirtieth Day of April, 1991

Attest:

HARRY F. MANBECK, JR.

Attesting Officer

Commissioner of Patents and Trademarks